United States Patent Office 3,166,935
Patented Jan. 26, 1965

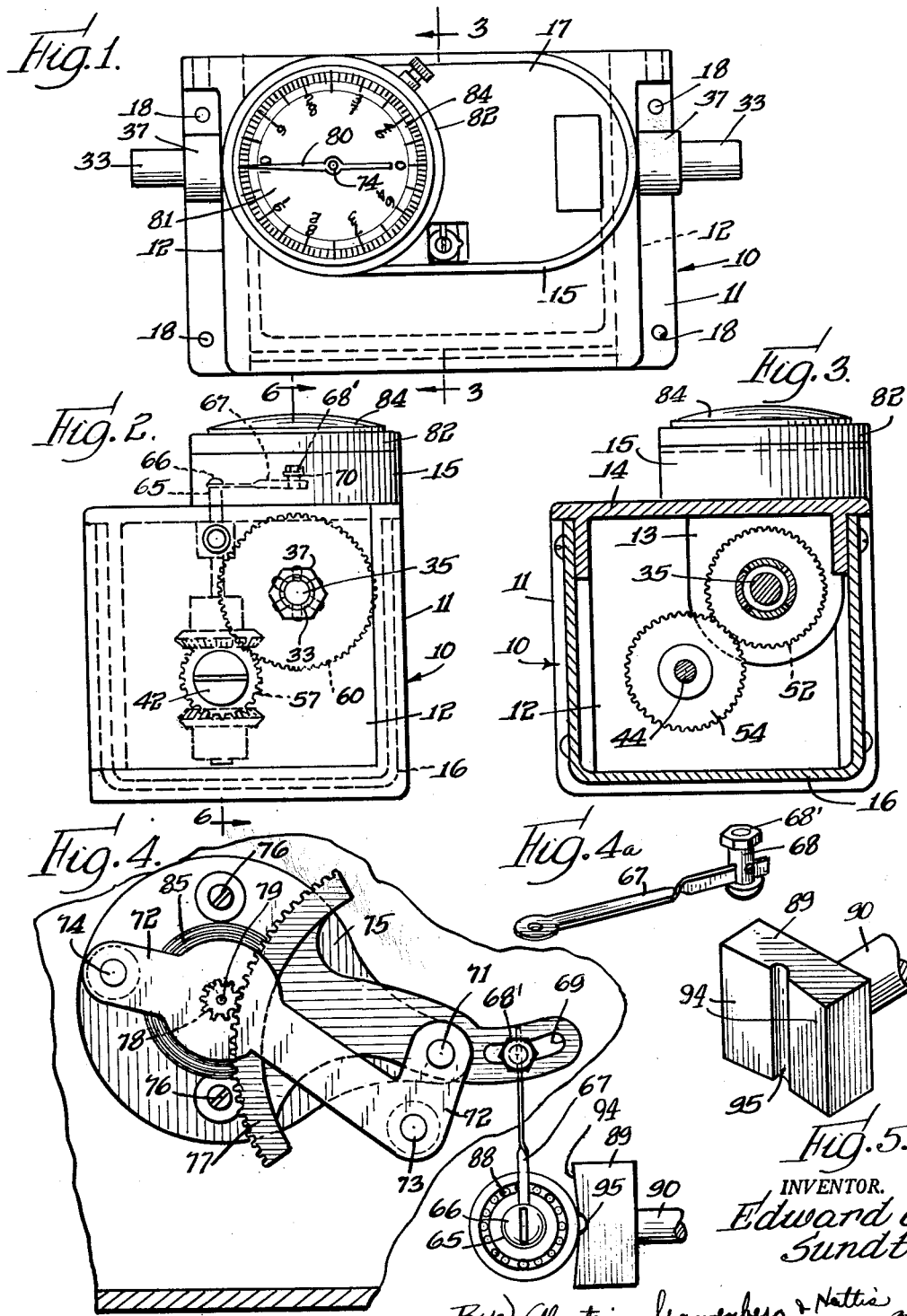

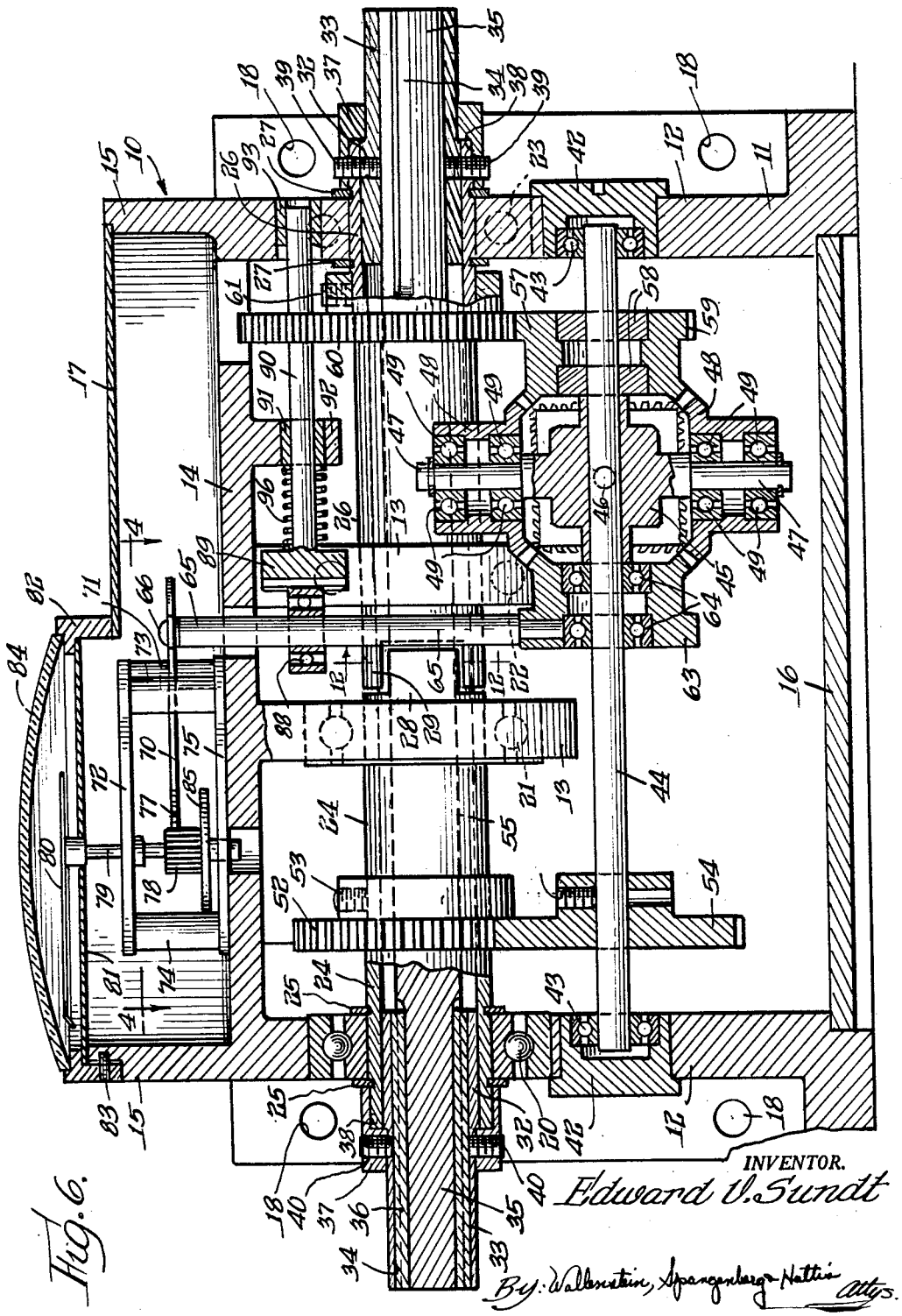

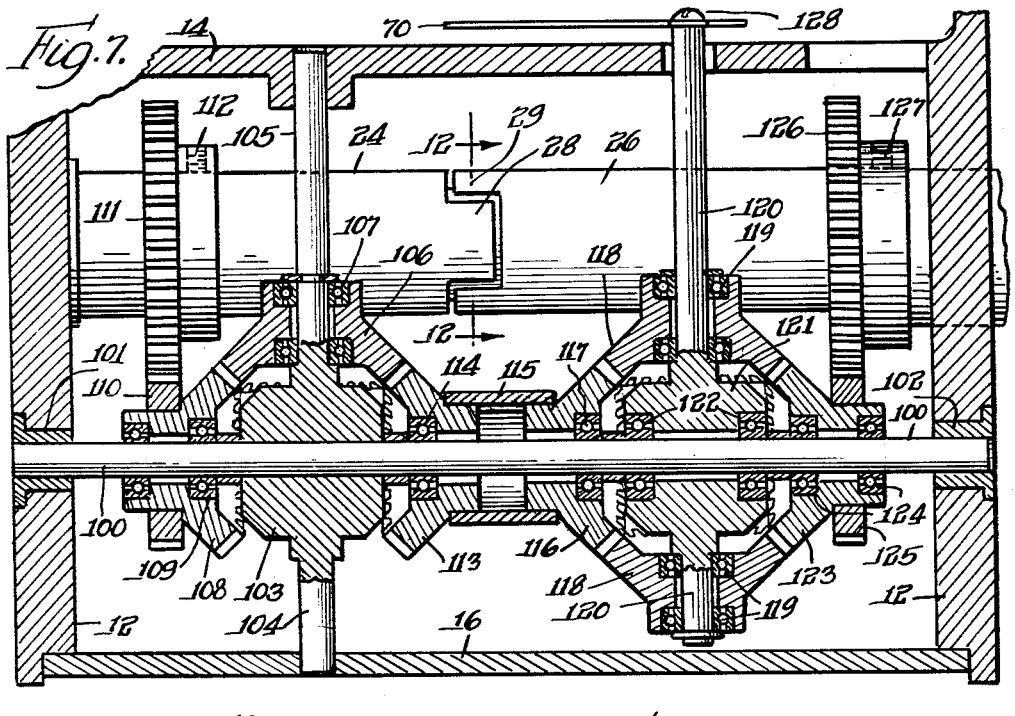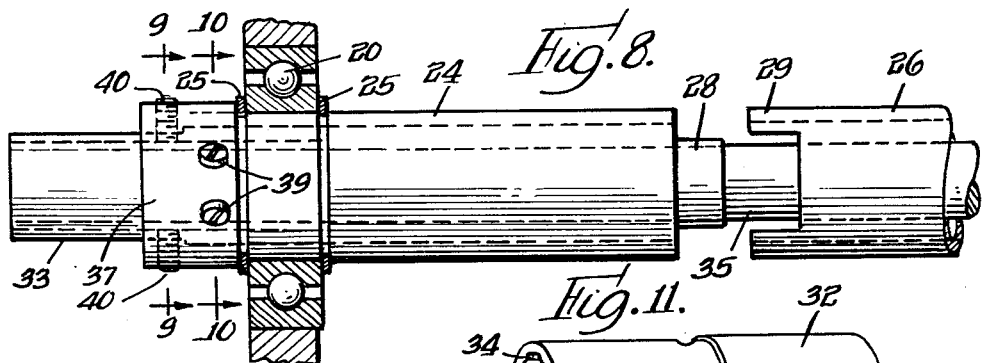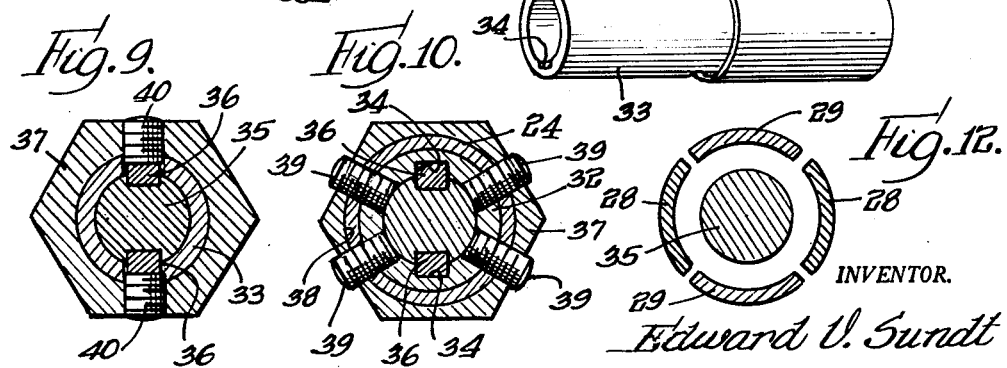

3,166,935
CONTINUOUS READING TORQUE METER
Edward V. Sundt, 1865 Miner St., Des Plaines, Ill.
Filed Mar. 21, 1961, Ser. No. 97,294
10 Claims. (Cl. 73—136)

The principal object of this invention is to provide an improved continuous reading torque meter for directly indicating rotating torques, wherein torques within various ranges may be readily measured and indicated, wherein rotating torques in one direction or in the opposite direction may be readily measured and indicated, wherein automatic stop means are provided for preventing undue twisting of the torque transmitting member, wherein simple and reliable differential means are provided for measuring the transmitted torque, wherein simple and reliable indicating means are provided for indicating the torque measured by the differential means, wherein damping and zeroing of the indicating means is readily obtained, and wherein adjusting means is provided for readily calibrating the indicating means.

Briefly, the continuous reading torque meter of this invention includes an elongated rotatably mounted torque member which twists in accordance with the torque transmitted therethrough, differential means connected to the torque member at spaced apart points near the ends thereof and operated in accordance with the twisting of the torque member between said spaced apart points, and an indicator operated by the differential means for indicating the amount of twisting of the torque member between said spaced apart points and hence the torque being transmitted therethrough.

Interengaging stop members are connected respectively to the torque member at said spaced apart points near the ends thereof for limiting the amount of twisting of the torque member between said spaced apart points so as to prevent undue twisting thereof. The interengaging stop members are preferably in the form of a pair of aligned sleeves provided at their inner ends with spaced apart interlocking stop projections. The sleeves and torque member are preferably secured together by bushings which are adapted to accommodate different sized torque members in the sleeves for adapting the torque member to different torque ranges.

The differential means comprises a differential gear assembly and, preferably, it includes a rotatably mounted spider having a spider gear rotatably carried thereby, a rotatably mounted driving gear meshing with the spider gear and a rotatably mounted driven gear meshing with the spider gear. A first gear means connects the torque member at one of said points near one end thereof to the spider for rotating the spider, and a second gear means connects the torque member at the other of said points near the other end thereof to the driving gear for rotating the driving gear, the gear ratio of the second gear means being twice that of the first gear means. As a result of these connections the rotatably mounted driven gear is rotated in a direction and to an extent depending upon the direction and extent of twisting of the torque member between said spaced apart points and hence the direction and amount of the torque being transmitted.

The rotatably mounted driven gear carries an arm which is connected by a linkage to the indicating means for operating the same for indicating the value and the directions of the transmitted torque. The linkage is adjustable to position and regulate the extent of movement of the indicating means with respect to the amount of twisting of the torque member for calibration purposes. A detent means is preferably associated with the arm carried by the driven gear for damping and normally maintaining the same in its mid-position to zero the indicating means.

Further objects of this invention reside in the details of construction of the continuous reading torque meter and in the cooperative relationships between the component parts thereof.

Other objects and advantages of this invention will become apparent to those skilled in the art upon reference to the accompanying specification, claims and drawings in which:

FIG. 1 is a top plan view of the continuous reading torque meter of this invention.

FIG. 2 is an end elevational view looking from the right of FIG. 1.

FIG. 3 is a vertical sectional view taken substantially along the line 3—3 of FIG. 1.

FIG. 4 is a sectional view taken substantially along the line 4—4 of FIG. 6 showing the manner of operating the indicating means.

FIG. 4a is a perspective view of the linage for operating the indicating means.

FIG. 5 is a perspective view of a portion of the detent means for damping and zeroing the indicating means.

FIG. 6 is an enlarged vertical sectional view taken substantially along the line 6—6 of FIG. 2.

FIG. 7 is a partial view similar to FIG. 6 but illustrating another form of differential means for operating the indicating means.

FIG. 8 is an enlarged elevational view of the torque member assembly as illustrated in FIG. 6.

FIG. 9 is a vertical sectional view taken substantially along the line 9—9 of FIG. 8.

FIG. 10 is a sectional view taken substantially along the line 10—10 of FIG. 8.

FIG. 11 is a perspective view of one of the bushings as illustrated in FIGS. 6, 8, 9 and 10.

FIG. 12 is a vertical sectional view taken substantially along the lines 12—12 of FIGS. 6 and 7.

Referring first to FIGS. 1 to 3 and 6, the continuous reading torque meter of this invention is generally designated at 10. It includes a frame 11 having end walls 12, inner bearing supports 13, a top wall 14 and an upwardly extending flange portion 15. The sides and bottom of the frame 11 are closed by a cover 16 suitably secured to the frame 11 and the top of the flange portion 15 is closed by a cover 17 suitably secured in place thereon. The end walls 12 of the frame are preferably provided with flanges having holes 18 by which the torque meter may be suitably mounted.

Referring more specifically to FIGS 6 and 8, a plurality of bearings, preferably ball bearings, 20, 21, 22 and 23 are arranged in the end walls 12 and the bearing supports 13. The ball bearings 20 and 21 rotatably mount a sleeve 24 which is held in place in the bearing 20 by means of snap rings 25. Correspondingly, the ball bearings 22 and 23 rotatably mount a sleeve 26 which is held in place with respect to the bearing 23 by snap rings 27. The inner end of the sleeve 24 is provided with projections 28 and the inner end of the sleeve 26 is provided with projections 29, the projections 28 and 29 overlapping and interlocking and being circumferentially spaced apart so as to provide a limited amount of relative rotation of the sleeves 24 and 26. The circumferential spacing between the projections 28 and 29 is preferably such as to limit the relative rotation of the sleeves 24 and 26 to about four degrees, the projections 28 and 29 on the sleeves 24 and 26 operating as stop members in this respect.

A bushing is received in the outer ends of each of the sleeves 24 and 26, each bushing including an enlarged portion 32 received within the sleeves and a smaller outwardly extending portion 33, each bushing having a substantially uniform inner cylindrical surface through the length thereof. The inner cylindrical surface of each bushing is provided with a pair of key slots 34. A torque member 35 is received in the bushings 32, 33 and it is provided at each end with a pair of key slots for receiving keys 36 which are also received in the key slots 34 in the bushings. A collar 37 having a counter-bore 38 is received over the end of each bushing 32, 33, the counter-bore receiving the outer ends of the sleeves 24 and 26 respectively. Screws 39 extend through the collars 37 and the sleeves 24 and 26 for securing the same to the enlarged portions 32 of the bushings. Also, screws 40 extend through the collars 37 and the smaller portions 33 of the bushings to engage the keys 36 and thus hold the keys in assembled relation.

Thus, the bushings 32, 33 and their collars 37 are keyed to the ends of the torque member 35. As torque is transmitted through the torque member 35, the torque member twists in accordance with the amount of torque being transmitted, the direction and extent of twisting being dependent upon the direction and amount of transmitted torque. The stop members 28 and 29 on the sleeves 24 and 26 operate to limit the amount of twisting of the torque member 35 so as to prevent undue twisting thereof. In this connection a power operated device may be connected to one end of the torque meter, as for example the bushing 33 at the right hand of FIG. 6, and a driven device may be connected to the other end of the torque meter, as for example the bushing 33 at the left hand of FIG. 6. Thus the amount of torque required to drive the driven device is reflected in the twisting of the torque member 35.

Different sized torque members 35 may be accommodated in the torque meter for measuring torques over various ranges, merely by utilizing appropriate bushings 32, 33 having appropriate internal bores for receiving the ends of the selected torque members. For example, torque ranges of 0–2.5 inch pounds to 0–200 inch pounds, may be readily obtained by using steel torque members of approximately 4.5 inch active length and having diameters ranging from .125 inch to .375 inch.

The end walls 12 of the frame 11 are each provided with retainers 42 which receive ball bearings 43 for rotatably mounting a shaft 44. A spider 45 is suitably secured to the shaft 44 for rotation therewith as by suitable set screws 46. The spider 45 is provided with a pair of stub shafts 47 upon which a pair of spider gears 48 are rotatably mounted by ball bearings 49. A gear 52 is secured to the sleeve 24 as by a set screw 53 and the gear 52 meshes with a gear 54 secured to the shaft 44 as by a set screw 55. Thus, as the sleeve 24 and hence the left hand end of the torque member 35 are rotated, the shaft 44 is correspondingly rotated to rotate the spider 45 and the spider gears 48 carried thereby.

A driving gear 57 is rotatably carried by the shaft 44 by means of suitable bearings 58, this driving gear 57 meshing with the spider gears 48. The driving gear 57 is provided with teeth 59 which mesh with the teeth of a gear 60 secured to the sleeve 26 as by a set screw 61. Thus, as the sleeve 26 and the right hand end of the torque member 35 are rotated the driving gear 57 is correspondingly rotated. The gear ratio between the gear 60 and the driving gear 57 is twice the gear ratio between the gears 52 and 54 so that the gear 57 is rotated twice as fast as the spider 45 is rotated.

A driven gear 63 is also rotatably mounted on the shaft 44 by means of ball bearings 64, the driven gear 63 meshing with the spider gears 48. So long as the sleeves 24 and 26 are rotated at the same speed and maintain the same relative positions, the driven gear 63 will remain stationary. However, as the rotative position of the sleeve 26 advances or lags behind the position of the sleeve 24, the driven gear 63 will rotate in one direction or the opposite direction depending upon whether the sleeve 26 advances or lags behind and the amount of such rotation will be dependent upon the amount of such advancing or lagging behind. Thus, the driven gear 63 is positioned in accordance with the direction and extent of twisting of the torque member 35 and, hence, in accordance with the direction and amount of torque transmitted by the torque member 35.

The driven gear 63 carries an arm 65 which extends upwardly through an opening in the upper wall 14 of the frame. A screw 66 carried by the outer end of the arm 65 secures one end of a link 67 to the arm 65. The other end of the link 67 is adjustably secured in a slot in a screw 68 by a suitable set screw. The screw 68 is in turn received in a slot 69 in a lever 70 pivoted at 71 and is adjustably secured in the slot 69 by a nut 68'. Thus, the position of the lever 70 may be adjusted with respect to the position of the arm 65 and the amount of movement imparted to the lever 70 by a given amount of movement of the arm 65 may also be adjusted.

The pivot 71 for the lever 70 is carried between a pair of plates 72 and 75 which are held in spaced apart relation by pillars 73 and 74. The plate 75 is suitably secured to the upper wall 14 of the frame 11 as indicated at 76. The lever 70 is provided at its opposite end with a gear sector 77 which meshes with a gear 78 carried by a shaft 79 journaled in the plates 72 and 75. The shaft 79 extends through an opening in a dial plate 81 and carries a pointer 80 which cooperates with suitable indicia on the dial plate for indicating the amount of the transmitted torque. The dial plate 81 is held in place by a bezel 82 carrying a transparent cover 84, the bezel being hold in place by suitable screws 83. Thus, as the arm 65 is positioned in accordance with the amount of torque being transmitted, the pointer 80 is correspondingly positioned with respect to the dial plate 81 for indicating the amount of torque being transmitted by the torque member 35. A spring 85 is preferably secured to the shaft for placing a bias thereon to take up any back lash in the gear teeth 77 and 78.

The arm 65 also preferably carries a roller bearing 88 which rides upon a detent member 89 carried by a shaft 90 slidably mounted in bushings 91 and 93 carried by a boss 92 depending from the upper wall 14 of the frame and by one end wall 12 of the frame. A spring 96 interposed between the detent member 89 and the boss 92 urges the detent member 89 against the ball bearing 88. As shown more clearly, FIGS. 4 and 5, the detent member 89 has a somewhat concave surface 94 provided with a central recess 95. The ball bearing 88 is engaged by the concave surface 94 and is normally seated in the recess 95 of the detent member. The recess 95 operates to center the arm 65 when no torque is present. However, when torque is being transmitted by the torque transmitting member 35, the ball bearing 88 rides out of the recess 95 along the concave surface 94, this being permitted by the spring 96, and the concave surface 94 operates to dampen oscillations of the arm 65. The detent member 89 thus allows damped indication of the torque being transmitted but, when the torque is substantially zero, the detent member operates to center the arm 65 and hence the indicating pointer 80.

Referring now to the arrangement shown in FIG. 7, a different differential means is utilized. Here a shaft 100 is carried by sockets 101 and 102 in the end walls 12 of the frame 11, the shaft 100 being stationary. A first spider 103 is carried by the shaft 100 and has its stub shafts 104 and 105 arranged in suitable holes in the cover 16 and the upper wall 14 of the frame, and in this way the spider 103 is held against rotation. A spider gear 106 is rotatably mounted on the stub shaft 105 by means of ball bearings 107. The spider gear 106 meshes with a driving gear 108 which is journaled for rotation on the shaft 100 by means of ball bearings 109. This driving gear 108 is provided with a gear 110 which meshes with a gear 111 secured to the sleeve 24 as by a set screw 112. The spider gear 106 also meshes with a driven gear 113 rotatably mounted on the shaft 100 by ball bearings 114. Thus, as the sleeve 24 is rotated the driving gear 108 is correspondingly rotated and the driven gear 113 is correspondingly rotated in the opposite direction by the spider gear 106.

The driven gear 113 is coupled to a driving gear 116 of a second differential mechanism by means of a sleeve 115 so that the driving gear 116 is driven commensurately with the driven gear 113. The driving gear 116 is rotatably mounted on the shaft 100 by ball bearings 117. This driving gear 116 meshes with a pair of spider gears 118 rotatably mounted by ball bearings 119 on stub shafts 120 of a spider 121 which in turn is rotatably mounted on the shaft 100 by means of ball bearings 122. The pair of spider gears 118 mesh with a driving gear 123 which is also rotatably mounted on the shaft 100 by ball bearings 124. This driving gear 123 carries a gear 125 which meshes with a gear 126 secured to the sleeve 26 as by means of a set screw 127. Thus, as the sleeve 26 is rotated the gear 123 is also rotated. The gears 116 and 123 rotate in opposite directions and, so long as the sleeves 24 and 26 rotate in unison, no motion is imparted to the spider 121. When, however, the sleeve 26 advances or lags behind the sleeve 24, the spider 121 is correspondingly rotated in one direction or the other to an extent depending upon the advancing or lagging of the sleeve 26 with respect to the sleeve 24. The stub shaft 120 of the spider 121 is connected by a screw 128 to a link such as the link 67 for operating the indicating device.

While the arrangement of FIG. 7 produces entirely satisfactory results in measuring torque transmission and in operating the indicating means in accordance with the torque transmission, the differential means of FIG. 6 is preferable in as much as twice the amount of motion, for a given amount of torque, is transmitted to the arm 65 than to the stub shaft 120. As a result the differential means of FIG. 6 is twice as sensitive as the differential means of FIG. 7 and it is, therefore, possible to obtain greater accuracy and efficiency with the differential means of FIG. 6.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. A continuous reading torque meter comprising, a rotatably mounted elongated torque member which twists in accordance with the torque transmitted therethrough, a pair of aligned sleeves connected respectively to the torque member at spaced apart points near the ends thereof and having spaced apart interlocking stop projections on their inner ends for limiting the amount of twisting of the torque member between said spaced apart points, differential means connected to the torque member at said spaced apart points near the ends thereof and operated in accordance with the twisting of the torque member between said spaced apart points, and an indicator operated by the differential means for indicating the amount of twisting of the torque member between said spaced apart points and hence the torque being transmitted therethrough.

2. A continuous reading torque meter comprising, a rotatably mounted elongated torque member which twists in accordance with the torque transmitted therethrough, a rotatably mounted spider having a spider gear rotatably carried thereby, first gear means connected to the torque member at a point near one end thereof and to the spider for rotating the spider, a rotatably mounted driving gear meshing with the spider gear, second gear means connected to the torque member at a point near the other end thereof and to the driving gear for rotating the driving gear, the gear ratio of the second gear means being twice that of the first gear means, a rotatably mounted driven gear meshing with the spider gear and angularly displaced in accordance with the twisting of the torque member between said points, and an indicator operated by the driven gear for indicating the amount of twisting of the torque member between said points and hence the torque being transmitted therethrough.

3. A continuous reading torque meter comprising, a rotatably mounted elongated torque member which twists in accordance with the torque transmitted therethrough, interengaging stop members connected respectively to the torque member at spaced apart points near the ends thereof for limiting the amount of twisting of the torque member between said spaced apart points, a rotatably mounted spider having a spider gear rotatably carried thereby, first gear means connected to the torque member at one of said points near one end thereof and to the spider for rotating the spider, a rotatably mounted driving gear meshing with the spider gear, second gear means connected to the torque member at the other of said points near the other end thereof and to the driving gear for rotating the driving gear, the gear ratio of the second gear means being twice that of the first gear means, a rotatably mounted driven gear meshing with the spider gear and angularly displaced in accordance with the twisting of the torque member between said spaced apart points, and an indicator operated by the driven gear for indicating the amount of twisting of the torque member between said spaced apart points and hence the torque being transmitted therethrough.

4. A continuously reading torque meter comprising, a pair of rotatably mounted aligned sleeves provided at their inner ends with spaced apart interlocking stop projections for limiting relative angular displacement thereof, an elongated torque member concentrically arranged within the aligned sleeves and secured at spaced apart points near its outer ends of the outer ends of the sleeves, the torque member twisting in accordance with the torque transmitted therethrough and the sleeves limiting the amount of twisting of the torque member between said spaced apart points, differential means secured to the sleeves and operated in accordance with the angular displacement of the sleeves and hence the twisting of the torque member between said spaced apart points, and an indicator operated by the differential means for indicating the amount of twisting of the torque member between said spaced apart points and hence the torque being transmitted therethrough.

5. A continuously reading torque meter comprising, a frame, an elongated torque member rotatably mounted in the frame and twisted in one direction or the other and in an amount in accordance with the direction and amount of torque transmitted therethrough, a pair of aligned sleeves connected respectively to the torque member at spaced apart points near the ends thereof and having spaced apart interlocking stop projections on their inner ends for limiting the amount of twisting of the torque member between said spaced apart points, differential means carried by the frame and including parts connected to the torque member at said spaced apart points near the ends thereof and a driven member operated by said parts and which is moved in one direction or the other and to an extent in accordance with the direction and amount of twisting of the torque member between said spaced apart points, an indicator carried by the frame having a mid-position corresponding to zero torque and operated in a direction and to an extent from the mid-position in accordance with the direction and extent of movement of the driven member of the differential means, and a detent means associated with the driven member of the differential means for normally maintaining the same in its mid-position to zero the indicator.

6. A continuously reading torque meter comprising, a frame, an elongated torque member rotatably mounted in the frame and twisted in one direction or the other and in an amount in accordance with the direction and amount of torque transmitted therethrough, a pair of aligned sleeves connected respectively to the torque member at spaced apart points near the ends thereof and having spaced apart interlocking stop projections on their inner ends for limiting the amount of twisting of the torque member between said spaced apart points, differential means carried by the frame and including parts connected to the torque member at said spaced apart points near the ends thereof and a driven member operated by said parts and which is moved in one direction or the other and to an extent in accordance with the direction and amount of twisting of the torque member between said spaced apart points, an indicator carried by the frame and including a graduated dial having a mid-position corresponding to zero torque, a pointer cooperating with the dial and having a gear for rotating the same, and a rotatable gear sector meshing with the gear of the pointer, and a linkage connection between the gear sector and the driven member of the differential means for operating the pointer of the indicator in a direction and to an extent from the mid-position in accordance with the direction and extent of the movement of the driven member of the differential means for indicating the direction and amount of torque transmitted through the torque member, said linkage connection being adjustable to regulate the extent of movement of the pointer with respect to the amount of twisting of the torque member.

7. A continuously reading torque meter comprising, a frame, an elongated torque member rotatably mounted in the frame and twisted in one direction or the other and in amount in accordance with the direction and amount of torque transmitted therethrough, a pair of aligned sleeves connected respectively to the torque member at spaced apart points near the ends thereof and having spaced apart interlocking stop projections on their inner ends for limiting the amount of twisting of the torque member between said spaced apart points, differential means carried by the frame and including parts connected to the torque member at said spaced apart points near the ends thereof and a driven member operated by said parts and which is moved in one direction or the other and to an extent in accordance with the direction and amount of twisting of the torque member between said spaced apart points, an indicator carried by the frame and including a graduated dial having a mid-position corresponding to zero torque, a pointer cooperating with the dial and having a gear for rotating the same, and a rotatable gear sector meshing with the gear of the pointer, a linkage connection between the gear sector and the driven member of the differential means for operating the pointer of the indicator in a direction and to an extent from the mid-position in accordance with the direction and extent of the movement of the driven member of the differential means for indicating the direction and amount of torque transmitted through the torque member, said linkage connection being adjustable to regulate the extent of movement of the pointer with respect to the amount of twisting of the torque member, and a detent means associated with the driven member of the differential means for normally maintaining the same in its mid-position to zero the indicator.

8. A continuously reading torque meter comprising, a pair of rotatably mounted aligned sleeves provided at their inner ends with spaced apart interlocking stop projections for limiting relative angular displacement thereof, an elongated torque member concentrically arranged within the aligned sleeves and secured at spaced apart points near its outer ends to the outer ends of the sleeves, the torque member twisting in accordance with the torque transmitted therethrough and the sleeves limiting the amount of twisting of the torque member between said spaced apart points, a rotatably mounted spider having a spider gear carried thereby, first gear means connected to one of the sleeves and to the spider for rotating the spider, a rotatably mounted driving gear meshing with the spider gear, second gear means connected to the other sleeve and to the driving gear for rotating the driving gear, the gear ratio of the second gear means being twice that of the first gear means, a rotatably mounted driven gear meshing with the spider gear and rotatable in accordance with the twisting of the torque member between said spaced apart points, and an indicator operated by the driven gear for indicating the amount of twisting of the torque member between said spaced apart points and hence the torque being transmitted therethrough.

9. A continuous reading torque meter comprising, a rotatably mounted elongated torque member which twists in one direction or another and to an extent in accordance with the direction and amount of torque transmitted therethrough, a rotatably mounted spider having a spider gear rotatably carried thereby, first gear means connected to the torque member at a point near one end thereof and to the spider for rotating the spider, a rotatably mounted driving gear meshing with the spider gear, second gear means connected to the torque member at a point near the other end thereof and to the driving gear for rotating the driving gear, the gear ratio of the second gear means being twice that of the first gear means, a rotatably mounted driven gear meshing with the spider gear and angularly displaced in one direction or another and to an extent in accordance with the direction and amount of twisting of the torque member between said points, an indicator having a mid-position corresponding to zero torque and operated by the driven gear in a direction and to an extent from the mid-position for indicating the direction and amount of twisting of the torque member between said points and hence the direction and amount of torque being transmitted therethrough, and a detent means associated with the driven gear for normally maintaining the same in its mid-position to zero the indicator.

10. A continuously reading torque meter comprising a pair of rotatably mounted aligned sleeves provided at their inner ends with spaced apart interlocking stop projections for limiting relative angular displacement thereof, an elongated torque member concentrically arranged within the aligned sleeves and secured at spaced apart points near its outer ends to the outer ends of the sleeves, the torque member twisting in accordance with the torque transmitted therethrough and the sleeves limiting the amount of twisting of the torque member between said spaced apart points, a rotatably mounted spider having a spider gear carried thereby, first gear means connected to one of the sleeves and to the spider for rotating the spider, a rotatably mounted driving gear meshing with the spider gear, second gear means connected to the other sleeve and to the driving gear for rotating the driving gear, the gear ratio of the second gear means being twice that of the first gear means, a rotatably mounted driven gear meshing with the spider gear and rotatable in accordance with the twisting of the torque member between said spaced apart points, an indicator operated by the driven gear for indicating the amount of twisting of the torque member between said spaced apart points and hence the torque being transmitted therethrough, and a detent means associated with the driven gear for normally maintaining the same in its mid-position to zero the indicator.

References Cited in the file of this patent

UNITED STATES PATENTS

| | | |
|---|---|---|
| 1,204,292 | McCormick | Nov. 7, 1916 |
| 1,839,354 | Spath | Jan. 5, 1932 |
| 2,986,038 | Cerny | May 30, 1961 |
| 3,039,301 | Leto et al. | June 19, 1962 |
| 3,069,903 | Larson | Dec. 25, 1962 |